Dec. 11, 1951 J. B. ASTON 2,577,870
ELECTRICALLY HEATED LUNCH KIT
Filed April 30, 1947 2 SHEETS—SHEET 1
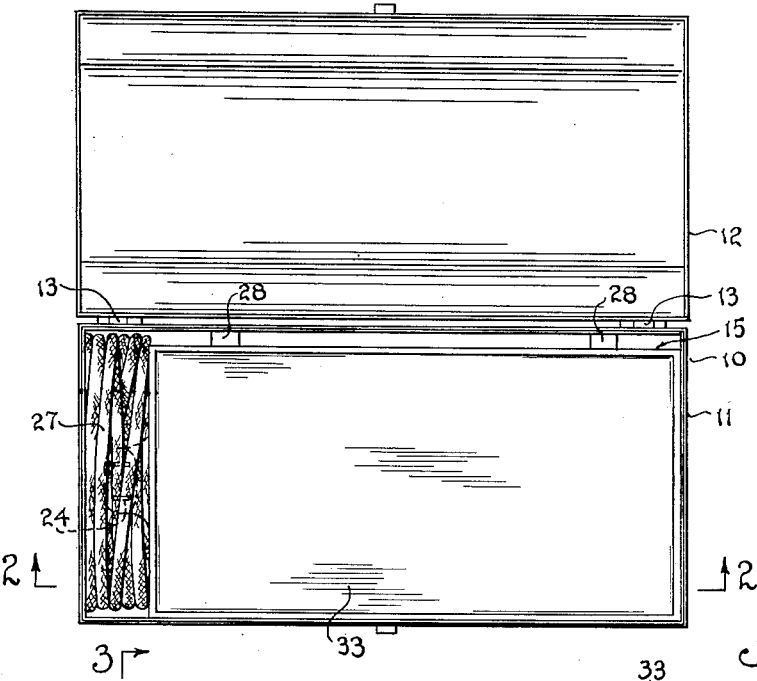
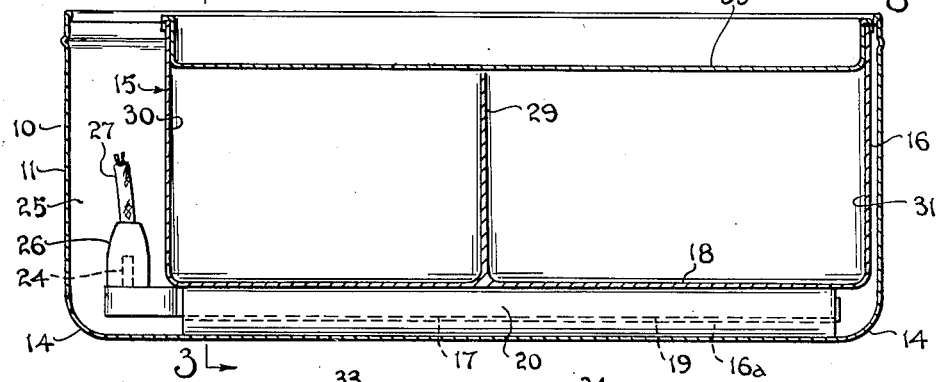
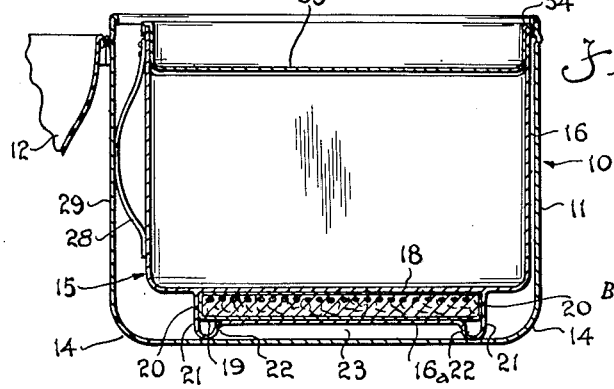
INVENTOR.
Jack B. Aston
BY William Cleland
Attorney Dec. 11, 1951      J. B. ASTON      2,577,870
ELECTRICALLY HEATED LUNCH KIT
Filed April 30, 1947      2 SHEETS—SHEET 2
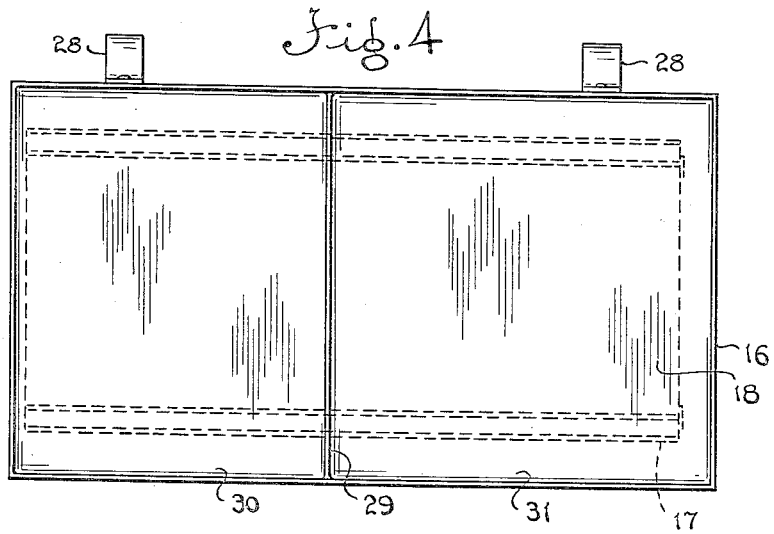
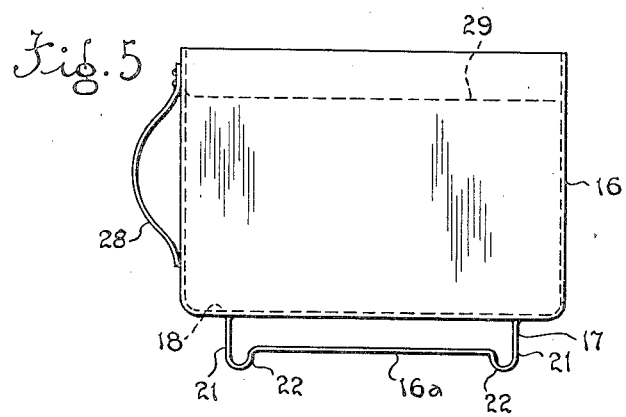
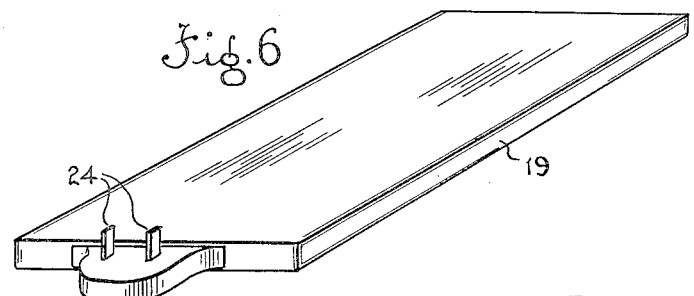
INVENTOR.
Jack. B. Aston
BY William Cleland
Attorney Patented Dec. 11, 1951

2,577,870

UNITED STATES PATENT OFFICE 2,577,870

ELECTRICALLY HEATED LUNCH KIT

Jack B. Aston, Rittman, Ohio

Application April 30, 1947, Serial No. 744,981

6 Claims. (Cl. 219—19)

1

This invention relates to an electrically heated lunch kit.

In the past, attempts have been made to provide lunch kits having electrical food-heating means therein, but such attempts have been generally unsatisfactory because the structures were too heavy and cumbersome, or were expensive to produce, or were difficult to keep clean.

One object of this invention is to provide, in combination with a portable lunch box, a compact food-heating and food-serving unit, including a food container and an electrical heating element attached thereto, said unit being adapted to be supplied as original equipment removably incorporated in the portable lunch box, or to be supplied as a separate device for incorporation in an available lunch box of similar character.

Another object of the invention is to provide a lunch kit of the character described wherein said unit is readily removable from the lunch box, and wherein the food container of the unit is adapted to be washed in water without affecting the heating element.

Another object of the invention is to provide a food-heating and serving unit of the character described, which is adapted to be removably incorporated in available lunch boxes within a substantial range of sizes and shapes.

These and other objects of the invention will be manifest from the following brief description and the accompanying drawings.

Of the accompanying drawings:

Figure 1 is a top plan view of a portable lunch box, having an improved food-serving and heating unit incorporated therein in accordance with the invention, a closure member of the lunch kit being shown open.

Figure 2 is a longitudinal cross-section, taken substantially on the line 2—2 of Figure 1.

Figure 3 is a transverse cross-section, partly broken away, taken substantially on the line 3—3 of Figure 2.

Figure 4 is a top plan view of the food-serving and heating unit shown removed from the portable lunch box.

Figure 5 is an end view of Figure 4, as viewed from the left thereof, and with the heating element removed.

Figure 6 is a perspective view of the heating element removed from said unit.

Referring to the drawings, the numeral 10 designates a portable lunch box, of known type, having a bottom box-like container part 11 and a top closure part 12 hinged thereto at 13, 13, said

2 bottom part being of generally rectangular shape, both lengthwise and in transverse cross-section. The bottom corners of the box part 11, however, are shown substantially rounded at 14, 14 to facilitate cleaning thereof. Lunch boxes of this type are relatively simple and inexpensive to manufacture.

Removably incorporated within the box part 11 may be a food-serving and heating unit 15, essentially comprising a food container 16 of the same general shape as the box part 11, and an elongated hollow guide part 17 integrally attached to the bottom wall 18 of the container 16 for sliding reception of a relatively thin, flat electrical heating element 19. Container 16 is of stainless steel or other material suitable for food-containing utensils. The element 19 has parallel side edges 20, 20 for guiding engagement with correspondingly parallel guide portions 21, 21 of guide part 17. For supporting the unit 15, with a substantial insulating air space 23 between the bottom of the box part 11 and the heating element 19, the guide part 17 may be formed with laterally spaced, longitudinally extending rib portions 22, 22. Heating element 19, and therefore guide part 17, is substantially narrower than box part 11 to allow for proper seating of the unit between substantially large radii of bottom corners 14 (see Figure 3).

Element 19 is metal encased, to provide for easy insertion and removal thereof with respect to the guide part 17, and suitable contact prongs 24, 24 are provided at one end thereof to project within a substantial clearance space 25 between the corresponding end of the container and box part 11, these prongs being adapted to receive a plug 26 of an electrical extension cord 27 adapted to be compactly coiled within said space 25 to hold the other end of unit 15 against the corresponding end of box part 11.

The container 16 is shown slightly narrower than the box part 11, and may be provided with one or more flat arcuate springs 28, 28 yieldingly engaging the adjacent side 29 of said box part, for maintaining the unit 15 in tight reception within said box part. The container 16 may be divided at 29, as shown, to provide food compartments 30 and 31 for containing different kinds of food, and the top of the partition is spaced from the top of container 16 to permit reception of the relatively shallow tray 33 within the container, the tray having outwardly rounded upper edges 34 engaging over the top edges of the container (see Figures 2 and 3).

The serving and heating unit 15 is adapted to be supplied either as original equipment in the lunch box 10 of the type described, or as a separate device for incorporation in readily available lunch boxes of such type. The size of the unit may thus be proportioned so that the spring 28 will retain the same within lunch boxes of a relatively wide range of sizes. The cord 27, when coiled within the compartment 25 described above, further serves to maintain the unit 15 against relative movement within the box part 11 while the lunch box is being carried.

In the use of the improved lunch kit, food provided in the compartment 30 and 31 of container 16 may be heated by means of heating element 19 upon plugging the extension cord 27 into a suitable source of electrical supply. The heated food may be consumed either while the unit 15 is retained in the lunch box, or after removing the unit from the lunch box. Similarly, when it is desired to clean the container 16, the unit is readily removed from the lunch box and the heating element may be removed from its guide part 17 (see Figures 4, 5 and 6).

Thus has been provided a simple, compact, easy to clean food-serving and heating unit, which may be supplied in combination with relatively inexpensive portable lunch boxes of known type, and which is also adapted to be sold as a separate device for use in readily available lunch boxes of varying sizes.

Modifications of the invention may be resorted to without departing from the spirit thereof or the scope of the appended claims.

What is claimed is:

1. The combination with a portable lunch box having a bottom box-like part and a top closure member, of a self-contained food containing and heating unit, said unit comprising a box-like food container adapted to be removably fitted within said bottom part, an elongated relatively flat electrical heating element, guide means on the underside of said container for removably slidably receiving said element, said guide means having portions supporting said container on the bottom of said bottom part with an air space between the same and said element.

2. The combination with a portable lunch box having a bottom box-like part and a top closure member, of a self-contained food containing and heating unit, said unit comprising a box-like food container adapted to be removably fitted within said bottom part, and elongated relatively flat electrical heating element, guide means on the underside of said container for removably slidably receiving said element, said guide means supporting said container on the bottom of said bottom part and being narrower than the container to clear the usual corner radii thereof.

3. The combination with a portable lunch box having a bottom box-like part and a top closure member, of a self-contained food containing and heating unit, said unit comprising a box-like food container adapted to be removably fitted within said bottom part, an elongated relatively flat electrical heating element, guide means on the underside of said container for removably slidably receiving said element, said guide means having portions supporting said container on the bottom of said bottom part with an air space between the same and said element, said guide means supporting said container on the bottom of said bottom part and being narrower than the container to clear the usual corner radii thereof.

4. The combination with a portable lunch box having a bottom box-like part and a top closure member, of a self-contained food containing and heating unit, said unit comprising a box-like food container adapted to be removably fitted within said bottom part, an elongated relatively flat electrical heating element, guide means on the underside of said container for removably slidably receiving said element, said guide means having portions supporting said container on the bottom of said bottom part with an air space between the same and said element, said guide means supporting said container on the bottom of said bottom part and being narrower than the container to clear the usual corner radii thereof, said container being substantially shorter lengthwise than said bottom part to provide a compartment at one end thereof for storage of said cord means.

5. The combination with a portable lunch box having a bottom box-like part and a top closure member, of a self-contained food containing and heating unit, said unit comprising a box-like food container adapted to be removably fitted within said bottom part, an elongated relatively flat electrical heating element, guide means on the underside of said container for removably slidably receiving said element, said guide means having portions supporting said container on the bottom of said bottom part with an air space between the same and said element, said guide means supporting said container on the bottom of said bottom part and being narrower than the container to clear the usual corner radii thereof, said container being substantially shorter lengthwise than said bottom part to provide a compartment at one end thereof for storage of said cord means, said container being of substantially less transverse width than said bottom part, and yieldingly self-adjusting means being provided on said unit for maintaining the unit against shifting within said bottom part.

6. A portable lunch box including a bottom box-like part and a top closure member thereon, a self-contained food containing and heating unit removably mounted in said bottom part and including a box-like food container and an electrical heating element, said electrical heating element having opposed guide portions thereon, guide means on the underside of said container for slidably receiving said opposed guide portions of said heating element, whereby said element is slidably removable with respect to said food container, and means for yieldingly removably mounting said unit within said bottom part with a heat insulating space between the bottom of said bottom part and said element.

JACK B. ASTON.

REFERENCES CITED

The following references are of record in the file of this patent:

UNITED STATES PATENTS

| Number | Name | Date |
|---|---|---|
| 1,377,092 | Phaneuf | May 3, 1921 |
| 1,412,761 | Lingstrom | Apr. 11, 1922 |
| 1,843,455 | McGowen | Feb. 2, 1932 |
| 1,979,222 | Goodwin | Oct. 30, 1934 |
| 2,035,147 | Dennis | Mar. 24, 1936 |
| 2,274,285 | Walker | Feb. 24, 1942 |
| 2,295,221 | King | Sept. 8, 1942 |
| 2,371,975 | Parsons | Mar. 20, 1945 |